(12) United States Patent
Tseng

(10) Patent No.: US 9,941,681 B2
(45) Date of Patent: Apr. 10, 2018

(54) CHAIN HEADER WITH SHIELD DESIGN

(71) Applicant: Molex, LLC, Lisle, IL (US)

(72) Inventor: Ting-Chang Tseng, Taipei (TW)

(73) Assignee: Molex, LLC, Lisle, IL (US)

( * ) Notice: Subject to any disclaimer, the term of this patent is extended or adjusted under 35 U.S.C. 154(b) by 58 days.

(21) Appl. No.: 15/016,458

(22) Filed: Feb. 5, 2016

(65) Prior Publication Data

US 2016/0268792 A1    Sep. 15, 2016

(30) Foreign Application Priority Data

Feb. 6, 2015 (TW) .............................. 104202002 U

(51) Int. Cl.
*H02G 11/00* (2006.01)
*H02G 3/04* (2006.01)
*F16G 13/16* (2006.01)

(52) U.S. Cl.
CPC ........... *H02G 11/006* (2013.01); *F16G 13/16* (2013.01); *H02G 3/04* (2013.01)

(58) Field of Classification Search
CPC ......... F16L 3/015; F16G 13/16; H02G 3/0475
USPC ......................................................... 59/78.1
See application file for complete search history.

(56) References Cited

U.S. PATENT DOCUMENTS

| 5,038,556 | A | * | 8/1991 | Moritz | .................... | F16G 13/16 |
|---|---|---|---|---|---|---|
| | | | | | | 248/49 |
| 6,128,893 | A | * | 10/2000 | Weber | ..................... | F16G 13/16 |
| | | | | | | 248/49 |
| 7,971,833 | B2 | * | 7/2011 | Utaki | ...................... | F16G 13/16 |
| | | | | | | 248/49 |
| 9,057,420 | B1 | * | 6/2015 | Hsieh | ...................... | F16G 13/16 |
| 2015/0211658 | A1 | * | 7/2015 | Lu | ........................... | F16L 3/015 |
| | | | | | | 59/78.1 |
| 2016/0149384 | A1 | * | 5/2016 | Lu | ........................ | H02G 3/0475 |
| | | | | | | 59/78.1 |

* cited by examiner

*Primary Examiner* — David B Jones
(74) *Attorney, Agent, or Firm* — Jeffrey K. Jacobs

(57) ABSTRACT

A cable guiding-protecting chain comprises a plurality of chain members and at least a header. The chain members have a front end and a rear end that are pivotally connected to each other to form a chain. The header is pivotally to the chain member at a distal end of the chain and the header includes a base and a cover. The base has a body with a hole formed therein and a first fastening unit is provided in the hole. The cover has two side walls spaced apart from each other, a top wall connecting the two side walls and a second fastening unit provided to the two side walls, the second fastening unit of the cover is engaged with the first fastening unit of the base in the header so as to allow the two side walls, the top wall and the base to cooperate to define a receiving space through which a cable passes.

11 Claims, 10 Drawing Sheets

CHAIN HEADER WITH SHIELD DESIGN

RELATED APPLICATIONS

This application claims priority to Taiwanese Application No. 104202002, filed Feb. 6, 2015, which is incorporated herein by reference in its entirety.

TECHNICAL FIELD

The present disclosure relates to a protecting chain, and more specifically to a cable guiding-protecting chain.

BACKGROUND ART

U.S. Pat. No. 6,128,893 (corresponding to Taiwanese patent application No. TW86116801) and U.S. Pat. No. 5,038,556 all disclose a header of a cable guiding chain. For example, using U.S. Pat. No. 6,128,893 as an example, the header comprises a base plate and two side plates spaced apart from each other and provided to two sides of the base plate, the base plate and the two side plates cooperate to form a receiving space having an opening opened upwardly, a cable may be placed into the receiving space via the opening of the header and pass through the header so as to be connected to a plug connector. However, a problem easily resulted from such a header lies in that, because the header has the opening, a part of the cable is exposed out of the header via the opening, when the cable guiding chain is pulled to move, the cable guiding chain may scrape the part of the cable exposed out of the header via the opening, thereby resulting in the cable to be worn, and even resulting in the cable to leak current, short-circuit or affect a signal transmission and so on, finally affecting performance stability of the cable.

SUMMARY OF THE INVENTION

Therefore, an object of the present disclosure is to provide a cable guiding-protecting chain which can protect a cable and is beneficial to the manufacturing and the processing of the cable.

Therefore, in embodiments, a cable guiding-protecting chain of the present disclosure comprises: a plurality of chain members and at least a header. The chain member at the front end and the chain member at the rear end are connected to each other and are pivoted to each other. The header is pivoted to the chain member at a distal end of the plurality of chain members and comprises a base and a cover. The base has a body, at least a hole formed to the body and a first fastening unit provided to the body. The cover has two side walls spaced apart from each other, a top wall connecting the two side walls and a second fastening unit provided to the two side walls, the second fastening unit of the cover is engaged with the first fastening unit of the base in the header so as to allow the two side walls, the top wall and the base to cooperate to define a receiving space through which a cable passes.

BRIEF DESCRIPTION OF THE DRAWINGS

The other features and effects of the present disclosure will be apparent through the embodiments in combination with the Figures, and.

DETAILED DESCRIPTION OF THE PREFERRED EMBODIMENTS

The following description relates to specific embodiments in combination with FIGURES which may implement—the present disclosure. Representations of directions, such as up, down, front rear, left and right, in the present disclosure are only the directions shown in the Figures. Therefore representations of directions are only used for explanation, but are not used to limit the present disclosure.

As can be appreciated, the effect of the present disclosure lies in that: by that the second fastening unit is engaged with the first fastening unit, the cover is assembled to the base and the cover and the body cooperate to define the receiving space which the cable passes through to receive the cable, the cable is enclosed and protected by the body, the two side walls and the top wall and is not circumferentially exposed to the outside. Moreover, because the cover and the base not only may be disengaged from each other but also may be engaged with each other in structure, the header may be assembled after the cable and a plug connector are processed and manufactured, which is beneficial to the processing and the manufacturing of the cable.

Figure 1:
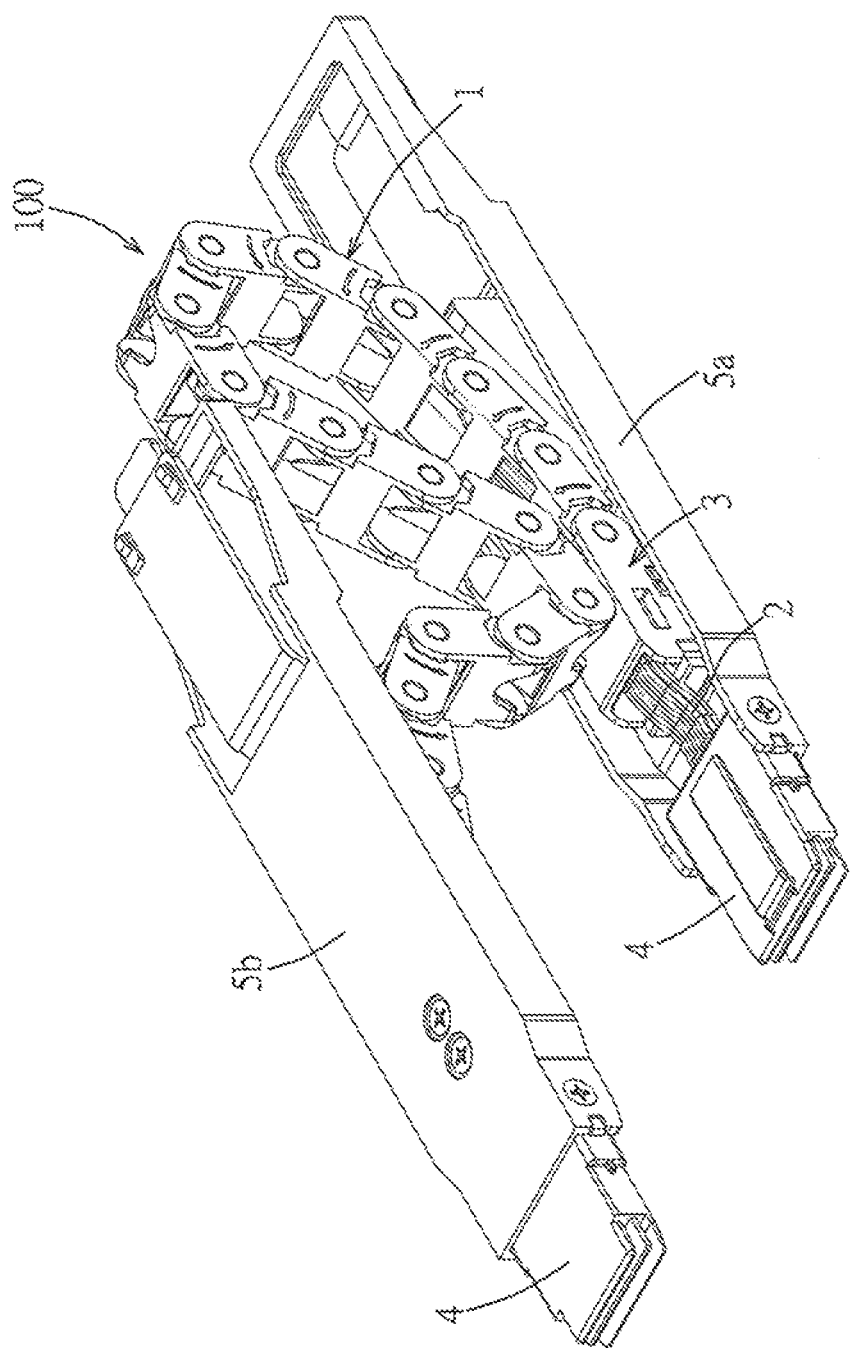
FIG. 1 is a perspective view illustrating an embodiment of a cable guiding-protecting chain with a cable passes through the cable guiding-protecting chain and two connectors.

Referring to FIG. 1, a cable guiding-protecting chain 100 is illustrated, a cable 2 passes through the cable guiding-protecting chain 100 and two ends of the cable 2 are respectively connected to two connectors 4, and the two connectors 4 are respectively fixed to a fixed frame 5a and a movable frame 5b. An embodiment of the cable guiding-protecting chain 100 comprises a plurality of chain members 1 and two headers 3 (one header 3 is invisible in FIG. 1 due to the view angle of FIG. 1). The chain members 1 are pivoted to each other and form a long chain shape, the two headers 3 are respectively pivoted to the two chain members 1 positioned respectively at two distal ends and are respectively fixed to the fixed frame 5a and the movable frame 5b.

Referring to FIG. 2 to FIG. 5, the two headers 3 may be identical in structure, so hereinafter one of the two headers 3 will be used as an example for the following description.

Figure 2:
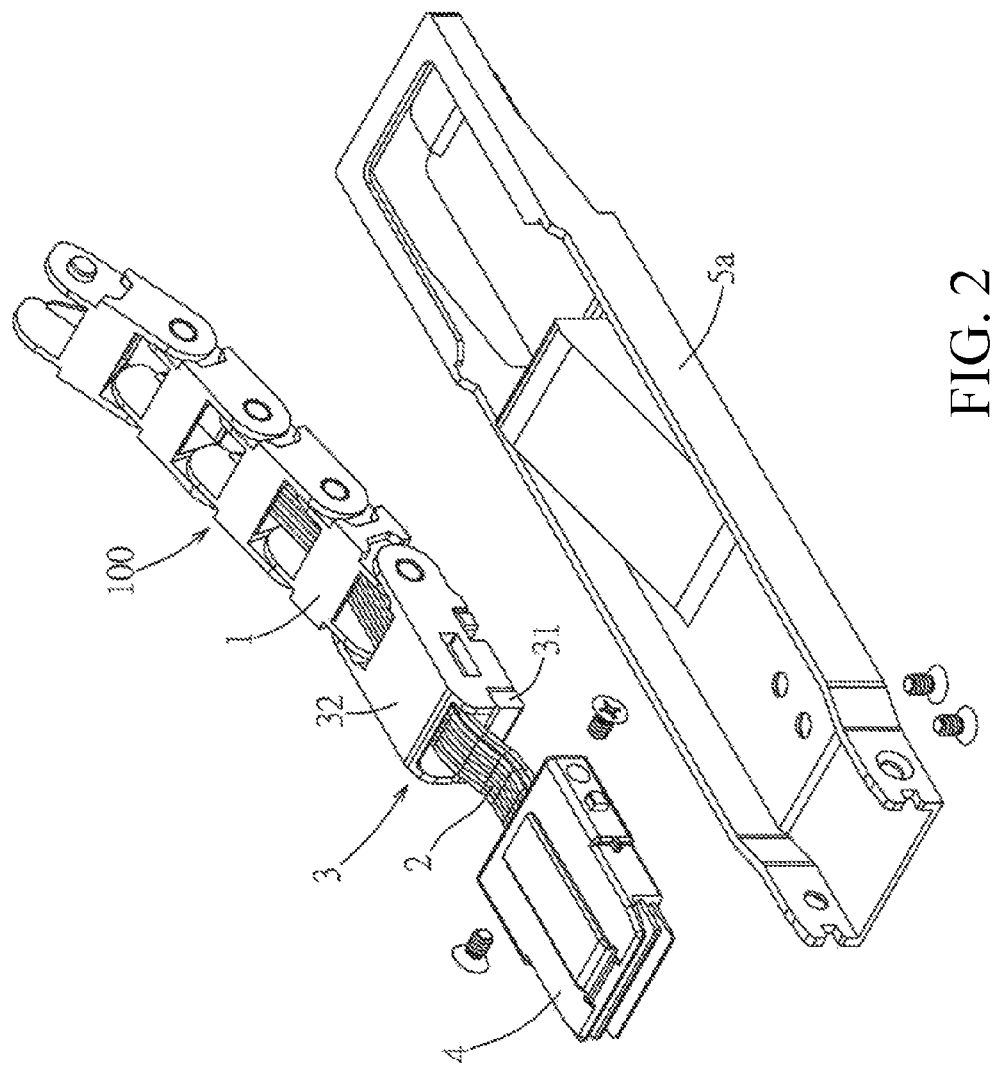
FIG. 2 is a perspective, partially exploded view illustrating an embodiment of chain members and a header.
Figure 3:
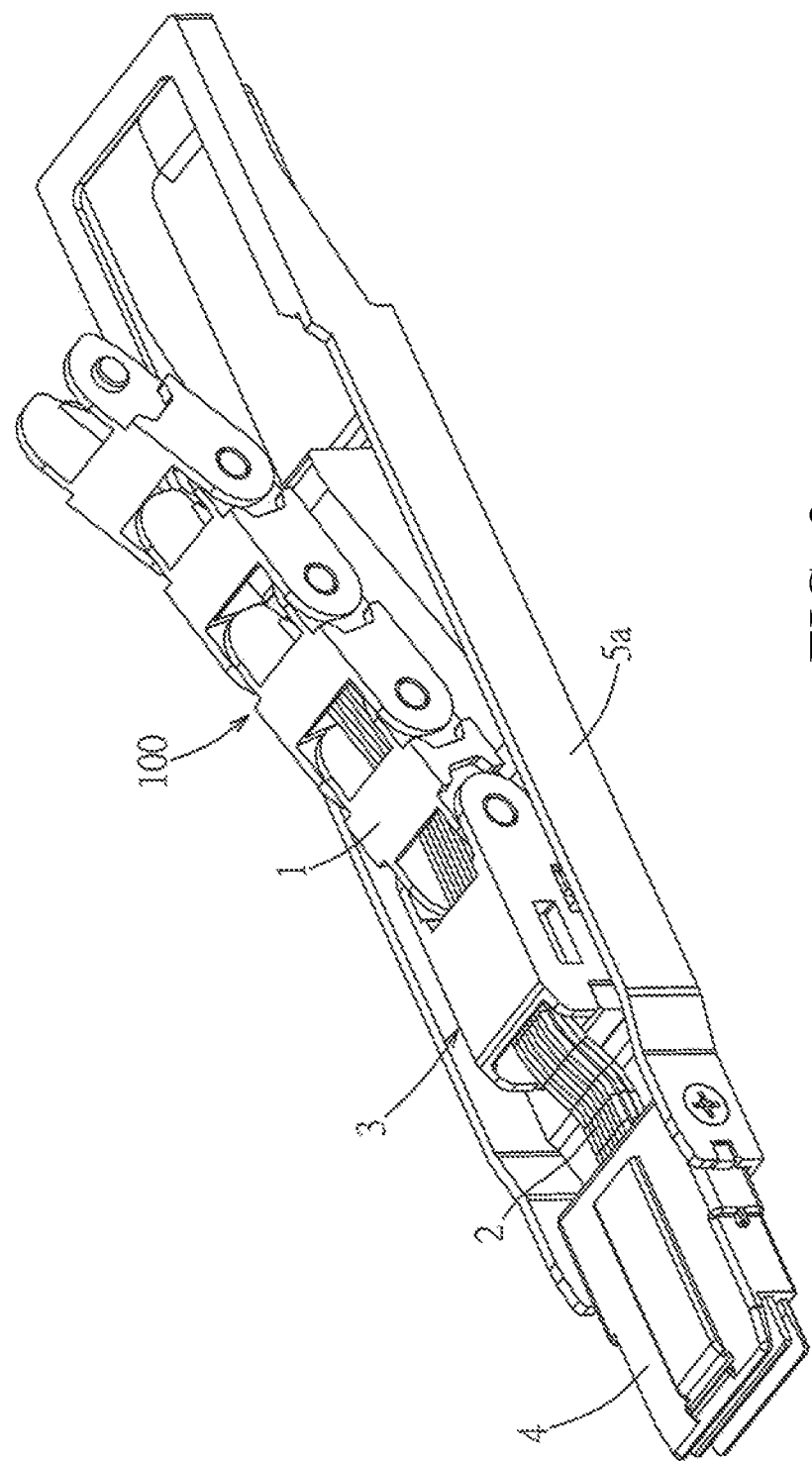
FIG. 3 is a perspective view illustrating the embodiment depicted in FIG. 2 in an assembled state.

The header 3 comprises a base 31 and a cover 32. The base 31 has a body 311, at least a (two in the embodiment)

hole 312 formed to the body 311 and a first fastening unit 313 provided to the body 311. A fastener (a screw as shown in FIG. 2) passes through the hole 312 and fastens the base 31 to the fixed frame 5a. The cover 32 has a pair of side walls 323 spaced apart from each other, a top wall 324 connecting the pair of side walls 323, a second fastening unit 322 provided to the pair of side walls 323, and a pair of pivoted units 320 respectively provided to the pair of side walls 323. Each pivoted unit 320 comprises a pivoted piece 320a and a shaft receiving aperture 325 provided to the pivoted piece 320a, the pair of pivoted units 320 define a rear end of the cover 32. The pair of side walls 323 and the top wall 324 are connected with each other to form an inverted U-shaped profile. And each side wall 323 has a front edge 323a opposite to the pivoted unit 320 and a top edge 323b where the top wall 324 is connected to the two side walls 323, a chamfer 323c is formed between the front edge 323a and the top edge 323b of each side wall 323, the chamfer 323c may be a chamfer in form of oblique plane surface or circular arc surface, the function of the chamfer 323c will be described later.

The second fastening unit 322 of the cover 32 and the first fastening unit 313 of the base 31 are engaged with each other, so as to allow the cover 32 and the base 31 to be engaged with each other and allow the pair of side walls 323, the top wall 324 and the body 311 to cooperate to define a receiving space 30 (see FIG. 7) to allow the cable 2 to pass through. For sake of the following explanation, it is defined that: the cable 2 passes through the receiving space 30 along a length direction L (see FIG. 7), the two side walls 323 of the cover 32 are spaced apart from each other along a width direction W, the top wall 324 of the cover 32 and the body 311 of the base 31 are spaced apart from each other along a height direction H.

As described above, the cover 32 is engaged with the base 31 by allowing the second fastening unit 322 of the cover 32 to be engaged with the first fastening unit 313 of the base 31. In the embodiment, the first fastening unit 313 and the second fastening unit 322 form a length direction engagement mechanism for limiting the cover 32 to move relative to base 31 along the length direction L, a width direction engagement mechanism for limiting the cover 32 to move relative to the base 31 along the width direction W, and a height direction engagement mechanism for limiting the cover 32 to move relative to the base 31 along the height direction H. In other words, the engagement between the first fastening unit 313 and the second fastening unit 322 provides three engagement mechanisms for the cover 32 and the base 31 respectively along the length direction L, the width direction W and the height direction H, which will be described in detail later.

In the embodiment, the first fastening unit 313 comprises two first flanges 314, two first hooks 315, two second hooks 318 and two first stopping portions 316. The two first flanges 314, the two first hooks 315, the two second hooks 318 and the two first stopping portions 316 each pair protrude outwardly from and are away from the body 311 of the base 31 respectively along two opposite sides in the width direction W. Because the first flange 314 protrudes outwardly from the body 311, a recessed space 314a is formed below the first flange 314, the first hook 315, the second hook 318 and the first stopping portion 316 are all positioned in the recessed space 314a below the first flange 314, and the first hook 315 and the second hook 318 are spaced apart from each other along the length direction L and all protrude outwardly beyond the first flange 314 along the width direction W, the first stopping portion 316 is positioned between the first hook 315 and the second hook 318. Each first hook 315 comprises a first recessed groove 317 recessed forwardly along the length direction L, each second hook 318 comprises a second recessed groove 319 recessed forwardly along the length direction L. Specifically, each first hook 315 comprises a first connecting segment 341 protruding along the width direction W and a first outside segment 342 extending from the first connecting segment 341 along the length direction L and spaced apart from the body 311, so the first hook 315 has a L-shaped profile when viewed from bottom, and the first hook 315 and the body 311 are connected so as to form the first recessed groove 317 therebetween. Similarly, each second hook 318 comprises a second connecting segment 351 protruding along the width direction W and a second outside segment 352 extending from the second connecting segment 351 along the length direction L and spaced apart from the body 311, so the second hook 318 has a L-shaped profile when viewed from bottom, and the second hook 318 and the body 311 are connected so as to form the second recessed groove 319 therebetween. Each first stopping portion 316 has a wedge-shape profile in cross section and in turn has a front stopping surface 36 and a rear oblique surface 37.

The second fastening unit 322 comprises two second flanges 326, two notch portions 327 and two second stopping portions 328. Specifically, the two second flanges 326 face each other and respectively protrude from two bottom edges of the two side walls 323 along the width direction W, and a width distance between two facing inside surfaces of the two second flanges 326 is less than a width distance between two opposite outside surfaces of the two first flanges 314 of the first fastening unit 313. The two notch portions 327 are respectively provided to the two second flanges 326, each notch portion 327 divides the second flange 326 into a front segment 326a and a rear segment 326b. In the embodiment, the second fastening unit 322 further comprises two first protruding blocks 329 and two second protruding blocks 330, the two first protruding blocks 329 protrude forwardly respectively from the two rear segments 326b of the two second flanges 326 along the length direction L and respectively enter into the two notch portions 327, the two second protruding blocks 330 respectively protrude forwardly from the two front segments 326a of the two second flanges 326 along the length direction L. The two second stopping portions 328 face each other and protrude respectively from the two inside surfaces of the two second flanges 326 along the width direction W, each second stopping portion 328 has a wedge-shape profile in cross section and in turn has a front oblique surface 38 and a rear stopping surface 39.

Figure 6:
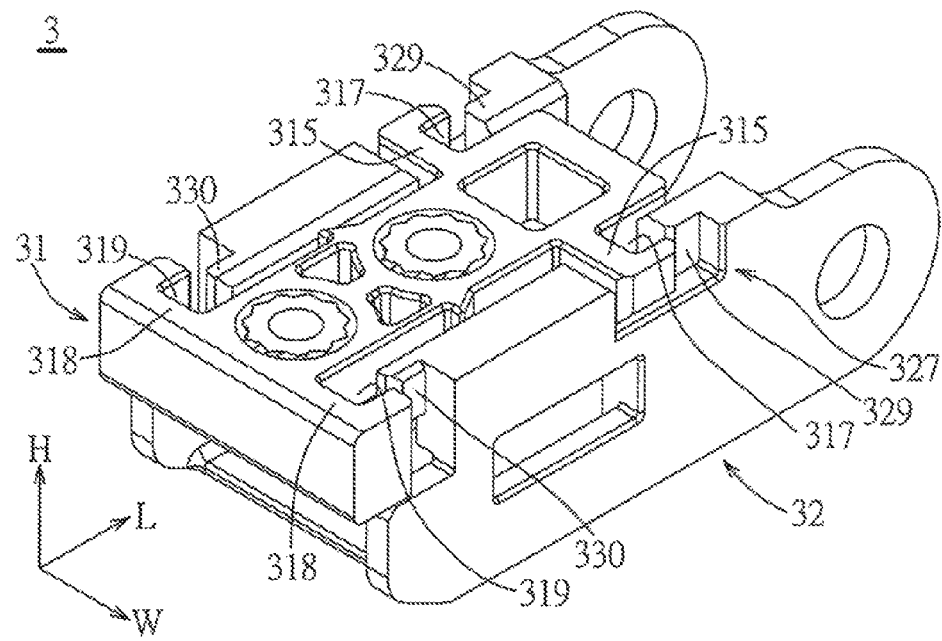
FIG. 6 is a perspective view of the embodiment depicted in FIG. 4 with the base and cover partially assembled together.
Figure 7:
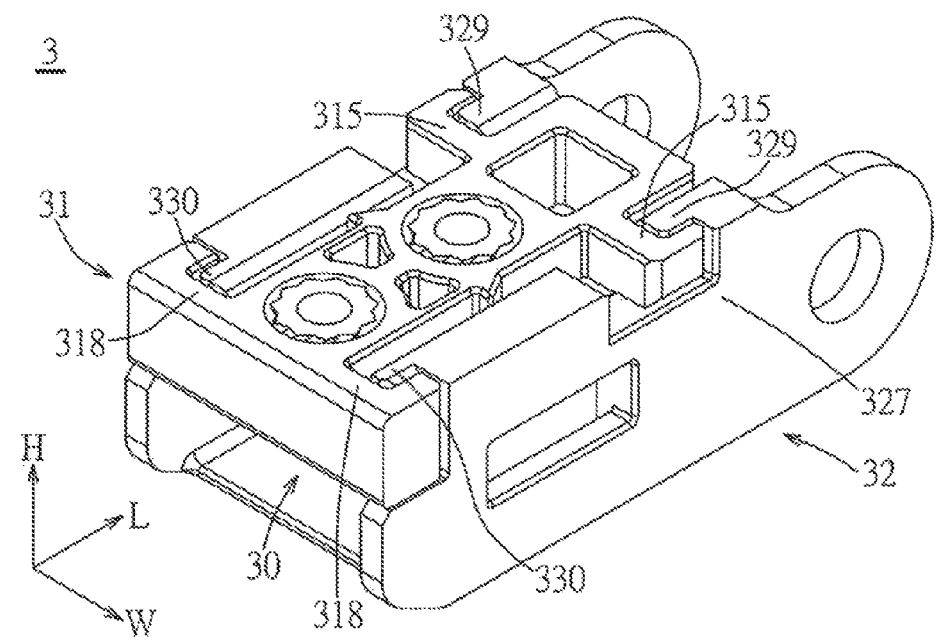
FIG. 7 is an assembled perspective view of the embodiment depicted in FIG. 6.
Figure 8:
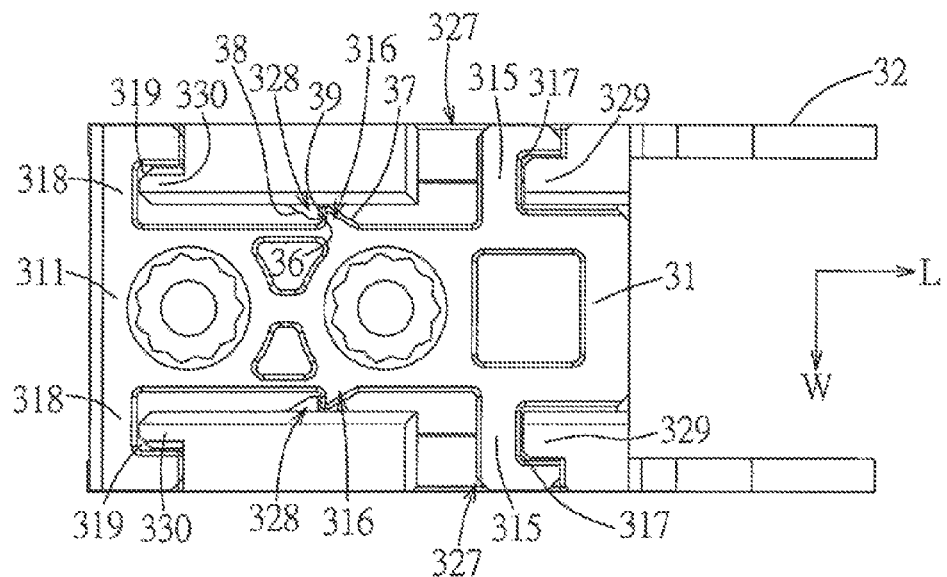
FIG. 8 is a top view of the embodiment depicted in FIG. 7.

Referring to FIG. 6, FIG. 7 and FIG. 8, when the base 31 has been fastened to the fixed frame 5a via the fastener passing through the hole 312 and the cover 32 will be engaged with the base 31, the two bottom edges of two side walls 323 of the cover 32 is disposed toward the base 31, and two side walls 323 are elastically deformed in a manner of being away from each other, so that the two second flanges 326 respectively pass through the two first flanges 314 which have the wider width distance therebetween and then the two second flanges 326 respectively enter into the two recessed spaces 314a respectively positioned below the two first flanges 314, at the same time, each first flange 314 is positioned between one corresponding second flange 326 and the top wall 324, and the two first hooks 315 are respectively disposed into the two notch portions 327. At this time, because the two second flanges 326 of the cover 32 are stopped respectively by the two first flanges 314 in a direction that the two second flanges 326 move upwardly, and the two notch portions 327 are stopped respectively by the two first hooks 315 in a direction that the two notch portions 327 move downwardly, so that the cover 32 is engaged with the base 31 along the height direction H and the cover 32 is limited by the base 31 along the height direction H. Therefore, the two first flanges 314, the two first hooks 315, the two second flanges 326 and the two notch portions 327 can be considered as the height direction engagement mechanism that the first fastening unit 313 and the second fastening unit 322 limit the cover 32 to move relative to the base 31 along the height direction H.

When the cover 32 has been engaged with the base 31 along the height direction H, the two second stopping portions 328 of the second fastening unit 322 are respectively positioned behind the two first stopping portions 316, the two first protruding blocks 329 are respectively positioned behind the two first recessed grooves 317 and the two second protruding blocks 330 are respectively positioned behind the two second recessed grooves 319, therefore, next the cover 32 is moved forwardly relative to the base 31, due to the pushing and abutting action between the two front oblique surfaces 38 of the two second stopping portions 328 and the two rear oblique surfaces 37 of the two first stopping portions 316 during contact therebetween, the two second flanges 326 of the cover 32 are deformed outwardly so as to allow the two second stopping portions 328 to respectively pass through the two first stopping portions 316 until the two front stopping surfaces 36 of the two first stopping portions 316 are respectively positioned behind the two rear stopping surfaces 39 of the two second stopping portions 328, so as to limit the cover 32 to move rearwardly relative to the base 31. On the another hand, because two front sides of the two first protruding blocks 329 are respectively stopped by the two first hooks 315 and two front sides of the two second protruding blocks 330 are respectively stopped by the two second hooks 318, the cover 32 is limited along a direction that the cover 32 moves forwardly, therefore the cover 32 is engaged with the base 31 along the length direction L and the cover 32 is limited by the base 31 along the length direction L. Therefore, the length direction engagement mechanism comprises the two first stopping portions 316, the two first hooks 315 and the two first protruding blocks 329 of the first fastening unit 313 and the two second stopping portions 328, the two second hooks 318 and the two second protruding blocks 330 of the second fastening unit 322.

While the two second stopping portions 328 respectively pass through the two first stopping portions 316, the two first protruding blocks 329 respectively enter into the two first recessed grooves 317 and at the same time the two second protruding blocks 330 respectively enter into the two second recessed grooves 319, the two first outside segments 342 and the two second outside segments 352 limit the cover 32 to move relative to the base 31 along the width direction W, at the same time, the cover 32 is engaged with the base 31 along the width direction W and the cover 32 is limited by the base 31 along the width direction W. Therefore, the width direction engagement mechanism comprises the two first hooks 315 and the first protruding blocks 329 of the first fastening unit 313 and the two second hooks 318 and the two second protruding blocks 330 of the second fastening unit 322.

Figure 9:
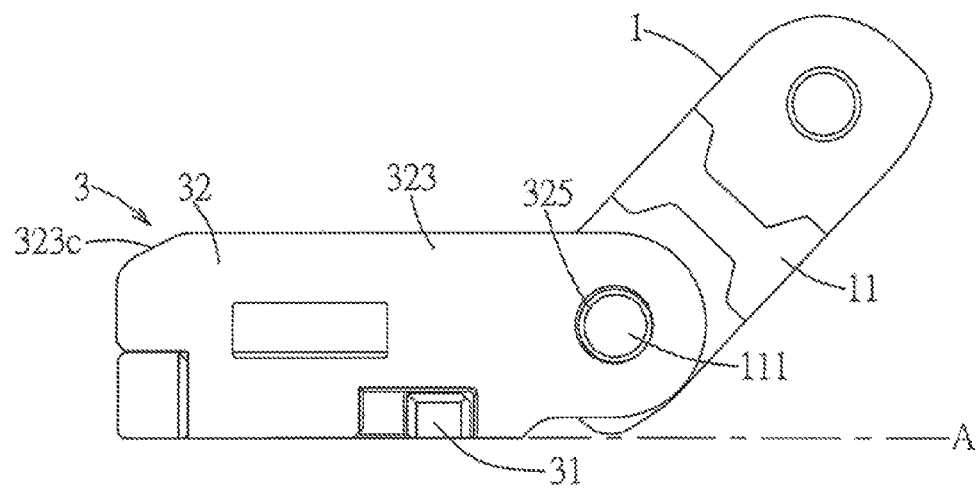
FIG. 9 is a side view illustrating two edges of two chain plates of the chain member positioned at a distal end.

Referring to FIG. 1 and FIG. 9, it should be especially noted that, the header 3 is pivoted to the chain member 1 positioned at the distal end via the pivoted unit 320. Specifically, each chain member 1 has two chain plates 11 each having at least a pivoting shaft 111, the chain member 1 positioned at the distal end and the header 3 are engaged with each other and pivoted to each other via the pivoting shafts 111 and the two shaft receiving apertures 325. And in the embodiment, the two pivoted units 320 of the cover 32 are provided in position and height so that two edges of the two chain plates 11 of the chain member 1 positioned at the distal end are not beyond a plane A where a bottom surface of the base 31 is present (as shown in FIG. 9) when the chain member 1 positioned at the distal end is pivoted to the header 3 and pivots relative to the header 3, so as to allow the chain member 1 positioned at the distal end to smoothly pivot without hindrance.

Figure 10:
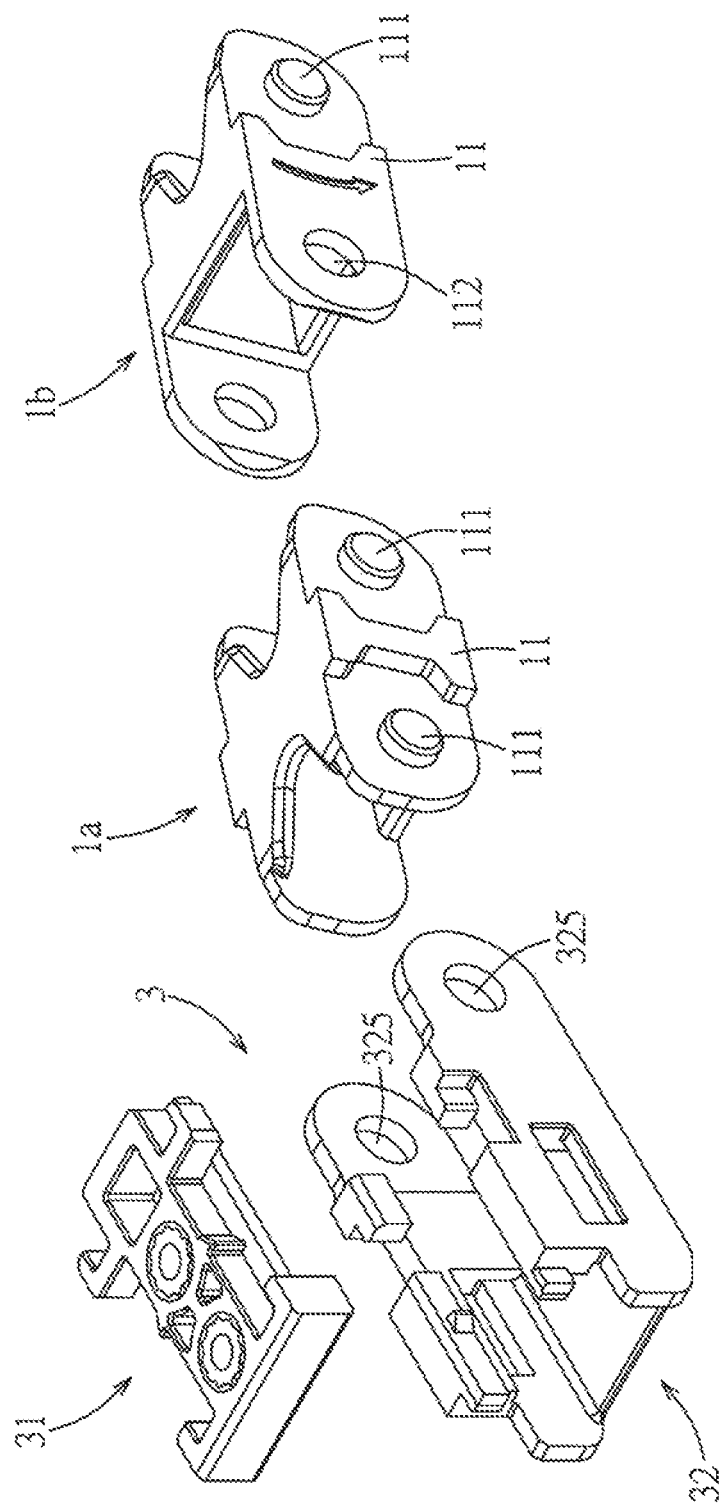
FIG. 10 is a perspective exploded view illustrating an assembly process of an embodiment of a header and chain members.
Figure 11:
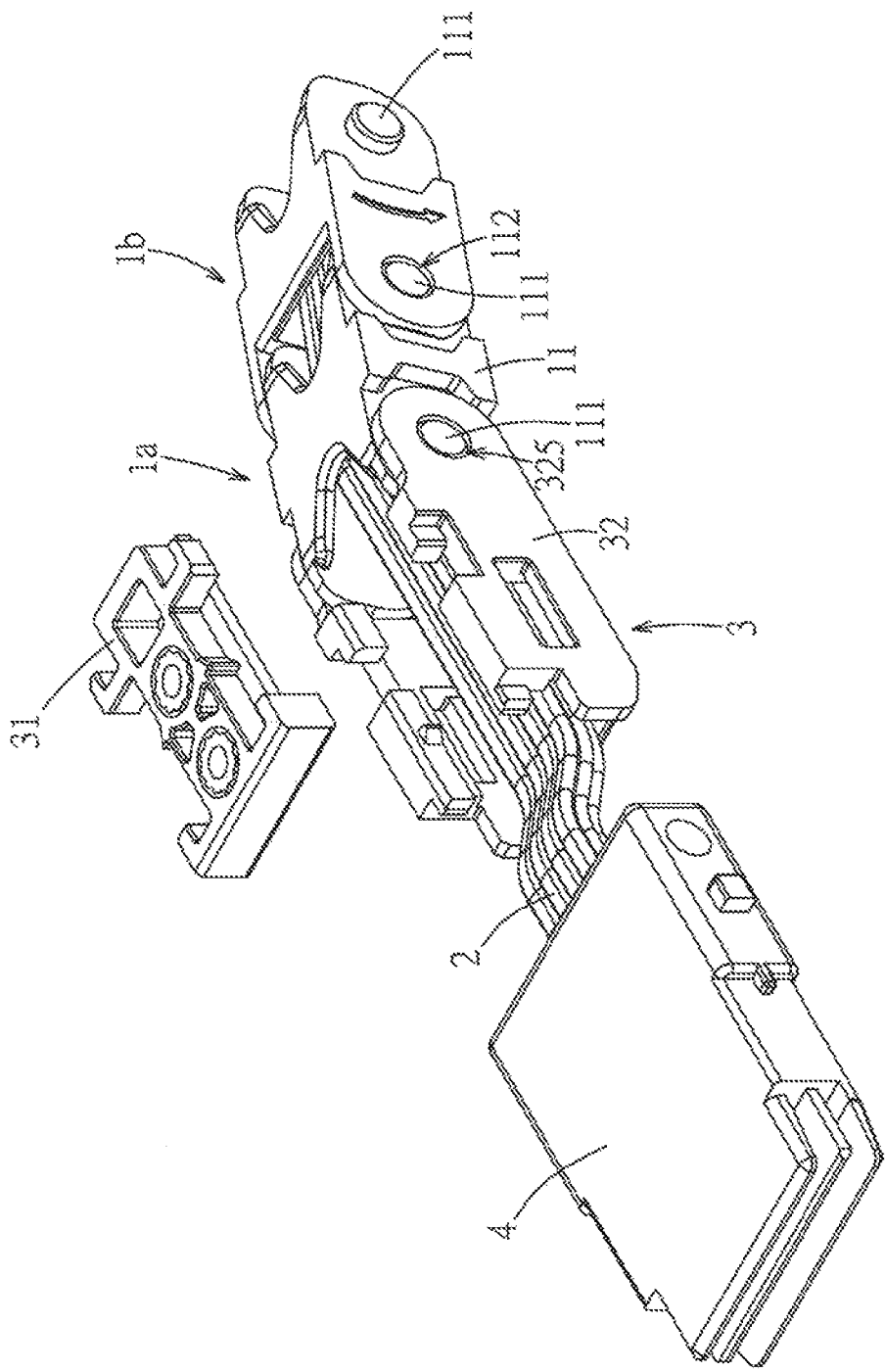
FIG. 11 is a perspective view illustrating further assembly of the header and the chain members depicted in FIG. 10.
Figure 12:
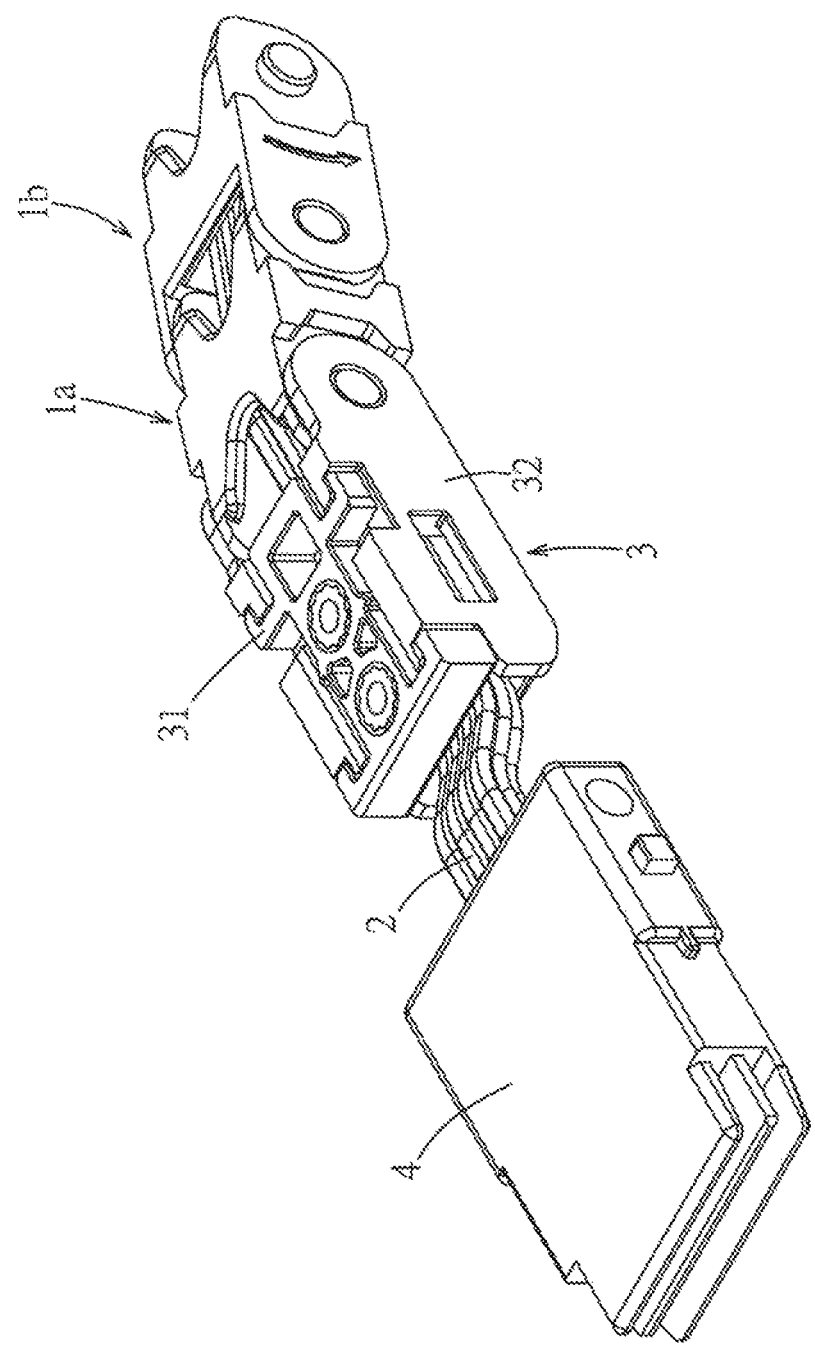
FIG. 12 is a perspective view illustrating the header and the chain members of FIG. 11 in an assembled form.

It should be noted that, referring to FIG. 10 to FIG. 12, in the embodiment, each chain plate 11 of the chain member 1a positioned at the distal end may also have two pivoting shafts 111, but each chain plate 11 of the chain member 1b not positioned at the distal end may have one pivoting shaft 111 and one shaft receiving aperture 112, and the chain member 1a positioned at the distal end and the chain member 1b not positioned at the distal end are pivoted to each other and connected in series via the two pivoting shafts 111 of the chain member 1a positioned at the distal end and the shaft receiving aperture 112 of the chain member 1b not positioned at the distal end.

Figure 4:
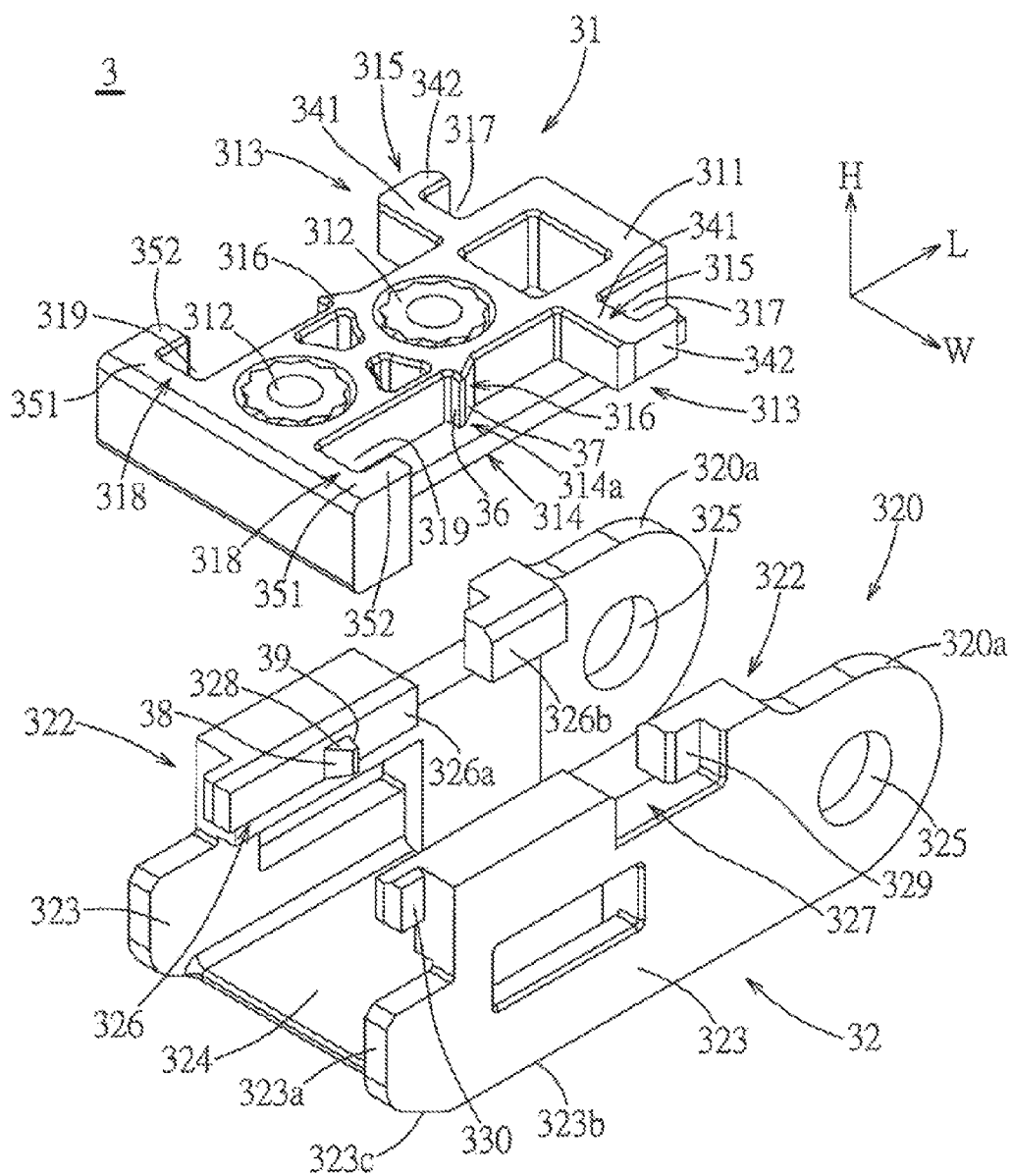
FIG. 4 is a perspective exploded view illustrating a base and a cover of the header.
Figure 5:
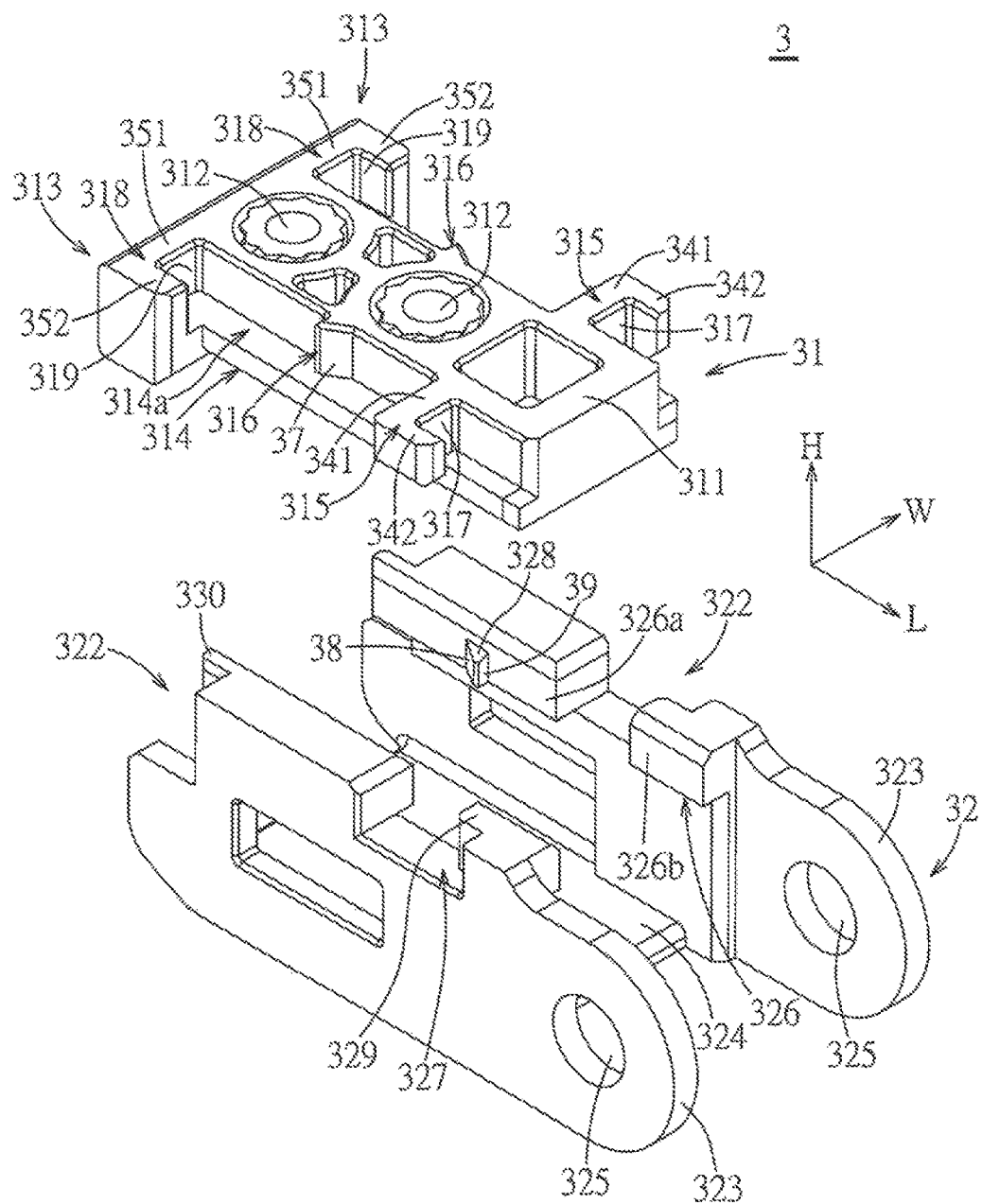
FIG. 5 is another perspective view of the embodiment depicted in FIG. 4.

In combination with referring to FIG. 1 and FIG. 4, in addition, the two chamfers 323c of the side walls 323 of the cover 32 of the header 3 are provided, when the cable guiding-protecting chain 100 is driven by the movable frame 5b to allow the chain member 1 to pass through the header 3 from above, the chain member 1 does not interference with the header 3 and in turn may smoothly pass through the header 3 from the above and hindrance is reduced.

In conclusion, by that the second fastening unit 322 of the cover 32 is engaged with the first fastening unit 313 of the base 31, the cover 32 is assembled to the base 31 and the cover 32 and the body 311 cooperate to define the receiving space 30 which the cable 2 passes through to receive the cable 2, the cable 2 is enclosed and protected by the body 311, the two side walls 323 and the top wall 324 and is not circumferentially exposed to the outside. Moreover, because the cover 32 and the base 31 not only may be disengaged from each other but also may be engaged with each other in structure, the header 3 may be assembled after the cable 2 and the connector 4 are processed and manufactured, which is beneficial to the processing and the manufacturing of the cable 2, therefore the object of the present disclosure is definitely attained, and there are the three engagement mechanisms between the cover 32 and the base 31 respectively along the three directions, therefore, the engagement stability between the cover 32 and the base 31 may also be assured.

The above described are only the embodiments, which cannot limit the scope of the implementation of the present disclosure, namely simple equivalent variations and modifications made according to the scope of the claims and content of the present disclosure are still fallen within the scope of the present disclosure.

What is claimed is:
1. A cable guiding-protecting chain, comprising:
 a plurality of chain members, each of the chain members having a front end and a rear end, wherein the front and rear ends are pivotally connected to each other so as to form a chain; and
 a header being pivotally attached to one of the chain members at a distal end of the chain and comprising:

a base having a body with a hole formed in the body and a first fastening unit provided in the hole; and a cover having two side walls spaced apart from each other, a top wall connecting the two side walls and a second fastening unit provided for the two side walls, the second fastening unit of the cover being engaged with the first fastening unit of the base so as to allow the two side walls, the top wall and the base to cooperate to define a receiving space through which a cable passes.

2. The cable guiding-protecting chain according to claim 1, further comprising a cable that passes through the receiving space along a length direction, the two side walls of the cover are spaced apart from each other along a width direction, the top wall of the cover and the body of the base are spaced apart from each other along a height direction, the first fastening unit and the second fastening unit are engaged with each other to form a length direction engagement mechanism for limiting movement of the cover relative to the base along the length direction; and a width direction engagement mechanism for limiting movement of the cover relative to the base along the width direction and a height direction engagement mechanism for limiting movement of the cover relative to the base along the height direction.

3. The cable guiding-protecting chain according to claim 2, wherein the body of the base is engaged between the two side walls of the cover and the first fastening unit of the base has two first flanges which protrude from and are away from the body respectively along two opposite sides in the width direction and two first hooks which protrude from and are away from the body respectively along the two opposite sides in the width direction, the two first hooks are positioned below the two first flanges and are respectively beyond the two first flanges; and the second fastening unit of the cover has two second flanges which face each other and respectively protrude from the two side walls along the width direction and two notch portions which are respectively provided to the two second flanges, a width distance between two facing inside surfaces of the two second flanges is less than a width distance between two opposite outside surfaces of the two first flanges; and the two second flanges respectively pass through the two first flanges so as to allow the two first flanges to be positioned between the two second flanges and the top wall and allow the two first hooks to be respectively disposed into the two notch portions, so that the cover is engaged with the base along the height direction and the height direction engagement mechanism comprises the two first flanges, the two first hooks of the first fastening unit and the two second flanges and the two notch portions of the second fastening unit.

4. The cable guiding-protecting chain according to claim 3, wherein the first fastening unit of the base further has two first stopping portions which protrude from and are away from the body respectively along the two opposite sides in the width direction; and the second fastening unit of the cover further has two second stopping portions which face each other and protrude respectively from the two second flanges, wherein, when the cover has been engaged with the base along the height direction, the cover is moved along the length direction to allow the two second stopping portions to respectively pass through the two first stopping portions so that the cover is engaged with the base along the length direction and the length direction engagement mechanism comprises the two first stopping portions of the first fastening unit and the two second stopping portions of the second fastening unit.

5. The cable guiding-protecting chain according to claim 4, wherein the second fastening unit of the cover further has two first protruding blocks which protrude respectively from the two second flanges along the length direction and respectively enter into the two notch portions; and each first hook of the first fastening unit of the base has a first recessed groove recessed along the length direction, wherein the two first protruding blocks respectively enter into the two first recessed grooves of the two first hooks when the cover is engaged with the base along the length direction so as to limit the cover to move relative to the base along the width direction, and the width direction engagement mechanism comprises the two first hooks of the first fastening unit and the two first protruding blocks of the second fastening unit.

6. The cable guiding-protecting chain according to claim 4, wherein the first fastening unit of the base further has two second hooks which protrude from and are away from the body respectively along the two opposite sides in the width direction, the two second hooks and the two first hooks are spaced apart from each other along the length direction, each second hook has a second recessed groove recessed along the length direction, wherein the second fastening unit of the cover further has two second protruding blocks which respectively protrude from the two second flanges along the length direction and the two second protruding blocks respectively enter into the two second recessed grooves of the two second hooks when the cover is engaged with the base along the length direction, wherein the width direction engagement mechanism further comprises the two second hooks of the first fastening unit and the two second protruding blocks of the second fastening unit.

7. The cable guiding-protecting chain according to claim 1, wherein the cover further has two pivoted units respectively provided for the two side walls and the header is pivotally connected to the chain member positioned at the distal end of the chain via the two pivoted units.

8. The cable guiding-protecting chain according to claim 7, wherein each pivoted unit of the cover comprises a pivoted piece and a shaft receiving aperture provided in the pivoted piece, the two pivoted units defining a rear end of the cover and each chain member has two chain plates, each chain plate having a pivoting shaft, wherein the chain member positioned at the distal end of the chain and the header are pivotally connected together via the two pivoting shafts and the two shaft receiving apertures.

9. The cable guiding-protecting chain according to claim 8, wherein the chain member positioned at the distal end of the chain and the header are pivotally connected to each other so that the edges of the two chain plates of the chain member positioned at the distal end of the chain does not pivot beyond a plane defined by a bottom surface of the base.

10. The cable guiding-protecting chain according to claim 1, wherein each side wall of the cover has a front edge opposite the pivoted unit and a top edge where the top wall is connected to the side wall and a chamfer is formed between the front edge and the top edge of each side wall.

11. The cable guiding-protecting chain according to claim 1, wherein the hole formed in the body is a first hole, the body further comprising a second hole.

* * * * *